United States Patent
Bae et al.

(10) Patent No.: US 8,416,346 B2
(45) Date of Patent: Apr. 9, 2013

(54) DISPLAY APPARATUS CAPABLE OF MOVING IMAGE AND CONTROL METHOD THEREOF

(75) Inventors: Myung-suk Bae, Hwaseong-si (KR); Dae-gyu Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 675 days.

(21) Appl. No.: 12/556,352

(22) Filed: Sep. 9, 2009

(65) Prior Publication Data

US 2010/0079672 A1   Apr. 1, 2010

(30) Foreign Application Priority Data

Sep. 30, 2008   (KR) .................. 10-2008-0096001

(51) Int. Cl.
*H04N 5/04* (2006.01)
*H04N 9/44* (2006.01)
*H04N 5/445* (2011.01)
*G06F 3/00* (2006.01)

(52) U.S. Cl.
USPC ...................... 348/511; 348/563; 715/761

(58) Field of Classification Search .................. 348/511, 348/468, 473, 563–567, 474; 715/764, 856, 715/862, 761, 717, 733–747
See application file for complete search history.

(56) References Cited

U.S. PATENT DOCUMENTS

| 5,541,662 | A  | * | 7/1996  | Adams et al. ............. 348/460 |
| 6,018,340 | A  |   | 1/2000  | Butler et al. |
| 6,545,669 | B1 |   | 4/2003  | Kinawi et al. |
| 6,876,396 | B2 | * | 4/2005  | Mizobuchi et al. ........ 348/564 |
| 6,919,864 | B1 | * | 7/2005  | Macor ....................... 345/1.1 |
| 6,977,690 | B2 | * | 12/2005 | Gomikawa ................ 348/468 |
| 2006/0143571 | A1 | * | 6/2006 | Chan ......................... 715/764 |
| 2007/0091208 | A1 | * | 4/2007 | Kim .......................... 348/565 |
| 2007/0124503 | A1 |   | 5/2007 | Ramos et al. |
| 2008/0151126 | A1 |   | 6/2008 | Yu |

FOREIGN PATENT DOCUMENTS

| EP | 1505825 A1  | 2/2005 |
| JP | 2003032507 A | 1/2003 |

* cited by examiner

*Primary Examiner* — Michael Lee
(74) *Attorney, Agent, or Firm* — Sughrue Mion, PLLC

(57) ABSTRACT

A display apparatus capable of moving an image and a control method thereof are provided. The display apparatus includes a display unit, an interface which receives image coordinate information and image source information from an external device that displays the image, and a controller which controls the display unit to display the image using the image coordinate information and image source information. Therefore, the image can continue to move between display apparatuses while being displayed, thereby increasing user convenience.

19 Claims, 7 Drawing Sheets

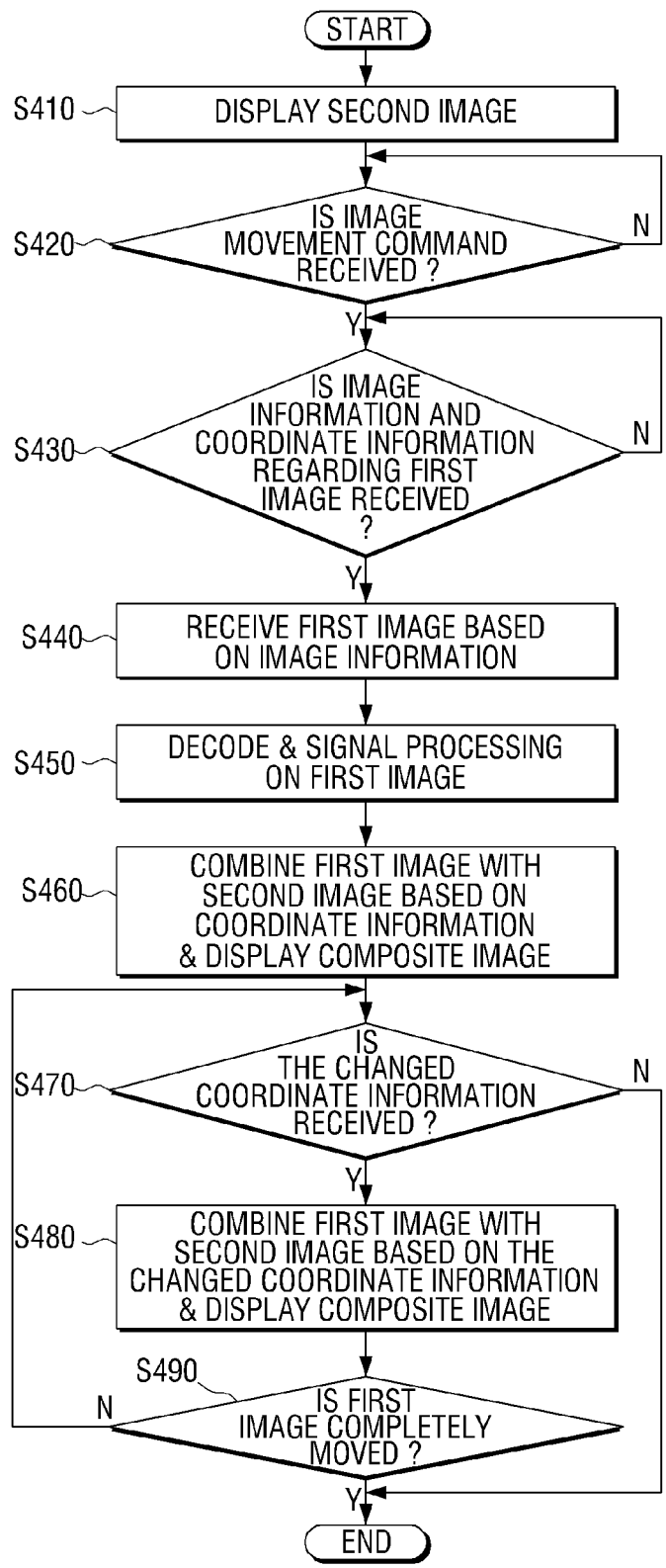

DISPLAY APPARATUS CAPABLE OF MOVING IMAGE AND CONTROL METHOD THEREOF

CROSS-REFERENCE TO RELATED APPLICATIONS

This application claims priority from Korean Patent Application No. 10-2008-0096001, filed on Sep. 30, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a display apparatus, and more particularly, to a display apparatus capable of moving an image to another display apparatus and a method of controlling the display apparatus to move an image to another display apparatus.

2. Description of the Related Art

Image apparatuses generally display or record broadcasts, images recorded on recording media, or images received from external sources. Such image apparatuses may be, for example, broadcast receiving apparatuses.

Related art broadcast receiving apparatuses receive images containing broadcast signals and display the received images. However, as new functions have been developed for broadcast receiving apparatuses, such apparatuses are able to display a plurality of images simultaneously. For example, a dual tuner or picture-in-picture (PIP) function enables two or more different broadcast signals to be received and displayed at the same time. Additionally, a multi-screen liquid crystal display (LCD) displays the same image or different images on two or more liquid crystal panels, so as to provide users with a variety of content.

If a broadcast receiving apparatus is connected to another display apparatus over a network, more functions for providing a variety of content may be activated.

However, if a user desires to view the image displayed on the other display apparatus, using the broadcast receiving apparatus, he or she may enter a command to stop the image being displayed on the other display apparatus and to receive and display the image on the broadcast receiving apparatus. However, in this situation, it is difficult for the image to continue to be displayed during this movement, which causes inconvenience to the user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus and a control method thereof in which an image displayed on one display apparatus is moved to another display apparatus and is displayed on the other display apparatus.

The present invention also provides a display apparatus and a control method thereof in which an image is displayed such that the image may continue to move between display apparatuses while being displayed on one or more of these display devices in order to enhance user convenience.

According to an aspect of the present invention, there is provided a display apparatus including a display unit; an interface which receives coordinate information regarding coordinates of an image and image source information regarding a source of the image from an external device that displays the image; and a controller which controls the display unit to display the image using the coordinate information and image source information.

The coordinate information may include coordinates of a portion of the image which is removed from a display area of the external device.

If a second image is displayed on the display unit instead of the image originally displayed, the controller may replace the second image with the original image and display the original image.

The controller may control display of the images such that the original image may gradually appear on the display unit and the second image may gradually disappear from the display unit in a direction in which the original image is removed from the display area of the external device.

If a second image is displayed on the display unit instead of the image originally displayed, the controller may superimpose and display the original image over the second image.

The display apparatus may further include a tuner. The image source information may include channel information regarding a channel of the image, and the controller may control the tuner to tune to a channel indicated by the channel information and to receive a signal corresponding to the image.

The display apparatus may further include a network interface. The image source information may include information regarding a uniform resource identifier (URI) of the image, and the controller may control the network interface to access the URI and receive a signal corresponding to the image.

The interface may receive an image signal corresponding to the image from the external device, and the controller may process the received image signal such that an image portion represented by the coordinate information may be displayed on the display unit.

According to another aspect of the present invention, there is provided a display apparatus including a display unit; an interface which communicates with an external device; and a controller which controls the display unit such that an image displayed on the display unit is removed from the display unit, and which transmits coordinate information regarding coordinates of the image to the external device via the interface, if a user command is received to move the image to the external device.

The coordinate information may include coordinates of a portion of the image which is removed from the display unit.

The display unit may include a touch screen panel, and the user command may be a command to cause the image to gradually disappear from the touch screen panel by touching and dragging on the touch screen panel.

The controller may transmit at least one of image source information regarding a source of the image and an image signal corresponding to the image to the external device.

According to another aspect of the present invention, there is provided a method for controlling a display apparatus, the method comprising receiving coordinate information regarding coordinates of an image displayed on an external device; and displaying the image using the received coordinate information.

The coordinate information may include coordinates of a portion of the image which is removed from a display area of the external device.

The displaying may include, if a second image is displayed instead of the image originally displayed, replacing the second image with the original image and displaying the original image.

The displaying may include gradually displaying the original image on a display area of the display apparatus while the second image gradually disappears from the display area of the display apparatus, in a direction in which the original image is removed from the display area of the external device.

The displaying may include, if a second image is displayed instead of the image originally displayed, superimposing and displaying the original image over the second image.

The receiving may include receiving image source information regarding a source of the image.

The image source information may include channel information regarding a channel of the image. The method may further include tuning to a channel indicated by the channel information and receiving a signal corresponding to the image.

The image source information may include information on a uniform resource identifier (URI) of the image. The method may further include accessing the URI and receiving a signal corresponding to the image.

The receiving may include receiving an image signal corresponding to the image from the external device.

According to another aspect of the present invention, there is provided a method for controlling a display apparatus capable of moving an image to an external device, the method including displaying the image which is being removed from a display area of the display apparatus, if a user command is received to move the image to the external device; and transmitting coordinate information regarding coordinates of the image to the external device.

The coordinate information may include coordinates of a portion of the image which is moved off the display area of the display apparatus.

The display area may include a touch screen panel, and the user command may be a command to cause the image to gradually disappear from the touch screen panel by touching and dragging on the touch screen panel.

The transmitting may include transmitting at least one of image source information regarding a source of the image and an image signal corresponding to the image to the external device.

According to another aspect of the present invention, there is provided a computer-readable recording medium recording a program which enables a computer to execute a method for controlling a display apparatus, including receiving coordinate information regarding coordinates of an image displayed on an external device; and displaying the image using the received coordinate information.

According to another aspect of the present invention, there is provided an image display system including a first display apparatus and a second display apparatus. The first display apparatus may include a touch screen panel, a first interface which communicates with the second display apparatus, and a first controller which, if a user command is received to move an image displayed on the touch screen panel off the touch screen panel by touching and dragging, transmits the user command to the second display apparatus via the first interface. The second display apparatus may include a display unit, a second interface which communicates with the first display apparatus, and a second controller which moves the image displayed on the touch screen panel to the display unit if the user command is received via the second interface.

According to another aspect of the present invention, there is provided a computer readable recording medium having recorded thereon a program for executing the following operations: displaying a first image on a first device; displaying a second image on a second device; and moving from the first device at least a portion of the first image; and displaying the moved portion of the first image on the second device while displaying at least a portion of the second image, where the first image is displayed on at least one of the first device and the second device during the moving.

The movement may be gradually performed based on a dragging operation by a user and wherein the moved portion of the first image is superimposed on the displayed second image.

The second device may include a broadcast tuner. The first device may include a touch screen panel for receiving a predetermined command. The movement is executed based on the predetermined command, and the first image is gradually moved in a predetermined direction such that the moved portion of the first image appears on the second device in the predetermined direction and a portion of the second image disappears from being displayed on the second device in the predetermined direction.

Another portion of the second image is moved to and is displayed on the first device. The quantity of the moved second image corresponds to the quantity of the moved first image.

The method may further include combining by a combiner unit of the second device the moved portion of the first image and the portion of the second image that is to be displayed on the second device.

BRIEF DESCRIPTION OF THE DRAWINGS

The above and/or other aspects of the present invention will be more apparent by describing certain exemplary embodiments of the present invention with reference to the accompanying drawings, in which:

FIG. 3 is a flowchart explaining operations of a first display apparatus to move an image displayed on a second display apparatus to the first display apparatus, according to an exemplary embodiment of the present invention;

FIGS. 6A to 6C are views provided to explain a process by which a user touches and drags an image to exchange images between a first display apparatus and a second display apparatus and then to display the exchanged images, according to an exemplary embodiment of the present invention.

DETAILED DESCRIPTION OF EXEMPLARY EMBODIMENTS

Figure 1:
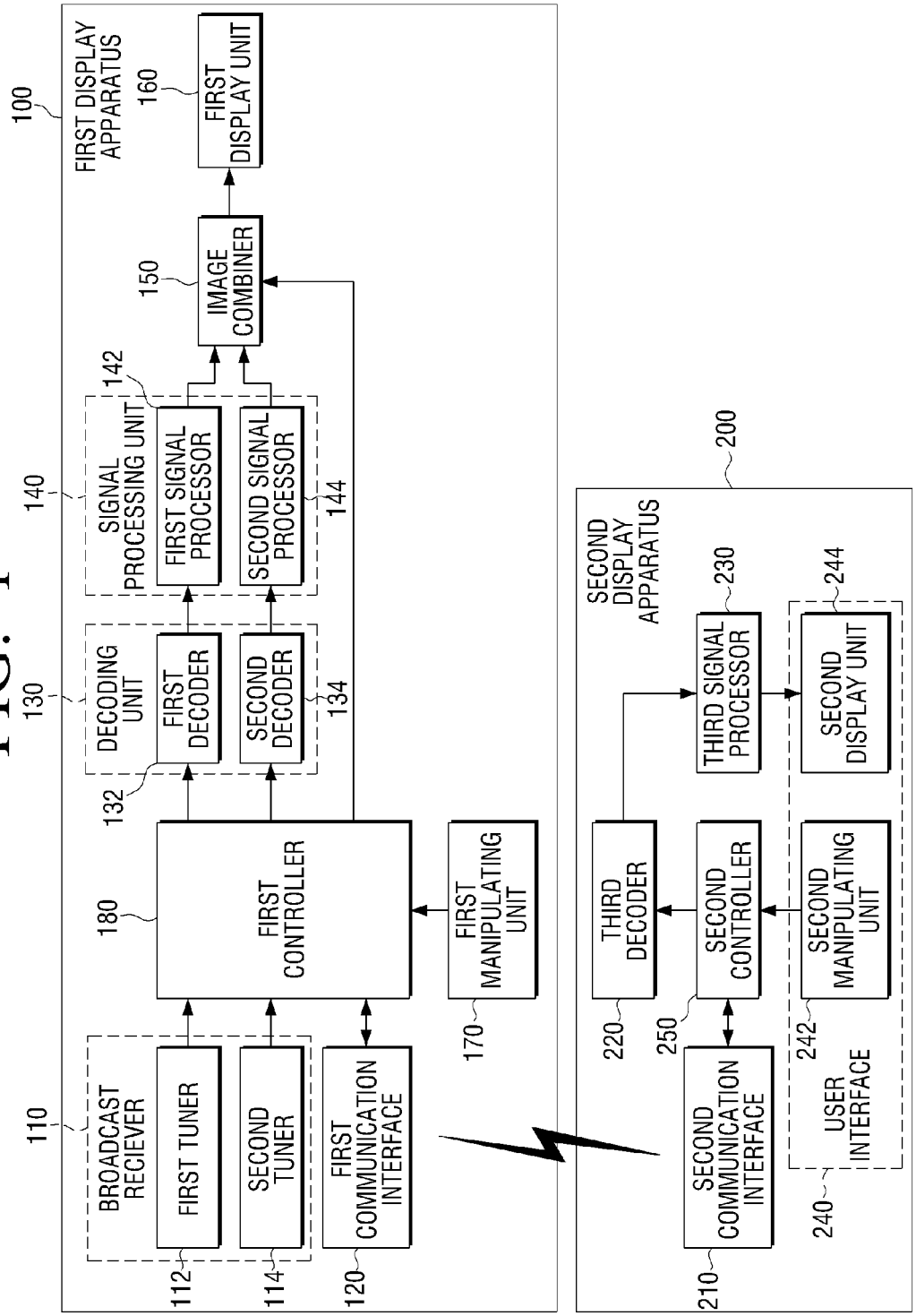
FIG. 1 is a block diagram of an image display system according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of an image display system according to an exemplary embodiment of the present invention. The image display system shown in FIG. 1 comprises a first display apparatus 100 and a second display apparatus 200. The first display apparatus 100 and the second display apparatus 200 may be implemented as a broadcast receiving apparatus, a personal computer (PC), a laptop computer or an electronic album.

In FIG. 1, the first display apparatus 100 comprises a broadcast receiver 110, a first communication interface 120, a decoding unit 130, a signal processing unit 140, an image combiner 150, a first display unit 160, a first manipulating unit 170 and a first controller 180.

The broadcast receiver 110 receives a broadcast wirelessly or by wire from a broadcast station or satellite. The broadcast receiver 110 may comprise a plurality of tuners, for example a first tuner 112 and a second tuner 114, in order to receive broadcasts.

The first communication interface 120 performs data communication with an external device. More specifically, the first communication interface 120 may transfer the broadcast signal received by the broadcast receiver 110 to the second display apparatus 200, or may receive data from the second display apparatus 200 and transfer the received data to the first controller 180.

The decoding unit 130 decodes an image output from the broadcast receiver 110 and transfers the decoded image to the signal processing unit 140, under the control of the first controller 180. The decoding unit 130 may comprise a plurality of decoders, for example, a first decoder 132 and a second decoder 134. The first decoder 132 decodes an image output from the broadcast receiver 110. If the broadcast receiver 110 transfers another image to the decoding unit 130 while the first decoder 132 is decoding the image, the second decoder 134 decodes the other image output from the broadcast receiver 110.

The signal processing unit 140 performs signal processing on the image output from the decoding unit 130 so that the image can be displayed. The signal processing unit 140 may comprise a plurality of signal processors, for example, a first signal processor 142 and a second signal processor 144. The first signal processor 142 performs signal processing on the image output from the first decoder 132 so that the image can be displayed, and the second signal processor 144 performs signal processing on the image output from the second decoder 134 so that the image can be displayed. In more detail, the signal processing unit 140 performs signal processing, such as scaling or interlacing, on a signal output from the decoding unit 130, so that an image corresponding to the processed signal may be displayed.

The image combiner 150 combines the images processed by the signal processing unit 140. If a single image is output from the signal processing unit 140, there is no need for the image combiner 150 to combine the images, but if a plurality of images are output from the signal processing unit 140, the image combiner 150 may combine the plurality of images under the control of the first controller 180.

The first display unit 160 displays an image output from the image combiner 150.

The first manipulating unit 170 receives manipulation commands from a user, and transfers the received commands to the first controller 180. The first manipulating unit 170 may be provided integrally with or separately from the first display apparatus 100. Additionally, the first manipulating unit 170 may comprise a remote controller for a user to input the manipulation commands, and a light receiver which receives an output signal of the remote controller to transmit the signal to the first controller 180. Furthermore, the first manipulating unit 170 may be implemented as a user interface through which a user can enter the commands using a menu screen.

The user commands may be received from the second display apparatus 200 via the first communication interface 120. In this situation, the second display apparatus 200 may function as a manipulating unit.

The first controller 180 controls the entire operation of the first display apparatus 100 according to the user commands entered through the first manipulating unit 170.

In more detail, the first controller 180 receives a user command to move an image (hereinafter, is referred to as a 'first image') displayed on the second display apparatus 200 to the first display apparatus 100 via the first communication interface 120, while another image (hereinafter, is referred to as a 'second image') is being displayed. Additionally, the first controller 180 receives image information for the first image and coordinate information for the first image disappearing from a display area of the second display apparatus 200. In this situation, the first controller 180 controls the broadcast receiver 110 to receive the first image based on the image information, and also controls the decoding unit 130 and signal processing unit 140 to process the received first image to be a signal capable of being displayed on the first display unit 160.

Furthermore, the first controller 180 controls the image combiner 150 to combine the first image with the second image. Specifically, the image combiner 150 combines the first image with the second image, based on the coordinate information for the first image disappearing from the display area of the second display apparatus 200 which is received from the first controller 180. An image combining process will be described later.

The image information may be an image signal corresponding to an image, or may be information regarding an image source. If image information relates to an image source, and if an image is a broadcast signal, the image information may be information on a channel of the broadcast signal. Additionally, if an image can be acquired from a network, information regarding an image source may comprise an associated uniform resource identifier (URI). Image information may comprise a variety of information to identify images.

The coordinate information relates to coordinates of a portion of the first image disappearing from the display area of the second display apparatus 200.

If the first communication interface 120 of the first display apparatus 100 is connected to an external device via a network, the first communication interface 120 may be referred to as a 'network interface', and the decoding unit 130, signal processing unit 140, image combiner 150, first display unit 160 and first controller 180 which are required to display an image may be collectively referred to as a 'display processor'.

The second display apparatus 200 comprises a second communication interface 210, a third decoder 220, a third signal processor 230, a user interface 240 and a second controller 250. The second communication interface 210, third decoder 220 and third signal processor 230 may perform the same functions as the first communication interface 120, decoding unit 130 and signal processing unit 140 of the first display apparatus 100, respectively, so no further description thereof is required. Additionally, the second display apparatus 200 may comprise an image source, such as a tuner, but this is omitted for convenience of description.

The user interface 240 may comprise a second manipulating unit 242 which receives user commands and transfers the received commands to the second controller 250, and a second display unit 244 which displays an image output from the third signal processor 230. The second display unit 244 may be implemented as a touch screen panel. Accordingly, a user may enter an image movement command while viewing an image displayed on the user interface 240, in order to move the image by touching and dragging.

The second controller 250 controls the entire operation of the second display apparatus 200. More specifically, if a user enters a command to move the image displayed on the user interface 240 by touching and dragging, the second controller 250 may acquire coordinate information associated with the image that has been removed from the user interface 240, and may transmit the acquired coordinate information and image information to the first display apparatus 100 via the second communication interface 210.

Figure 2:
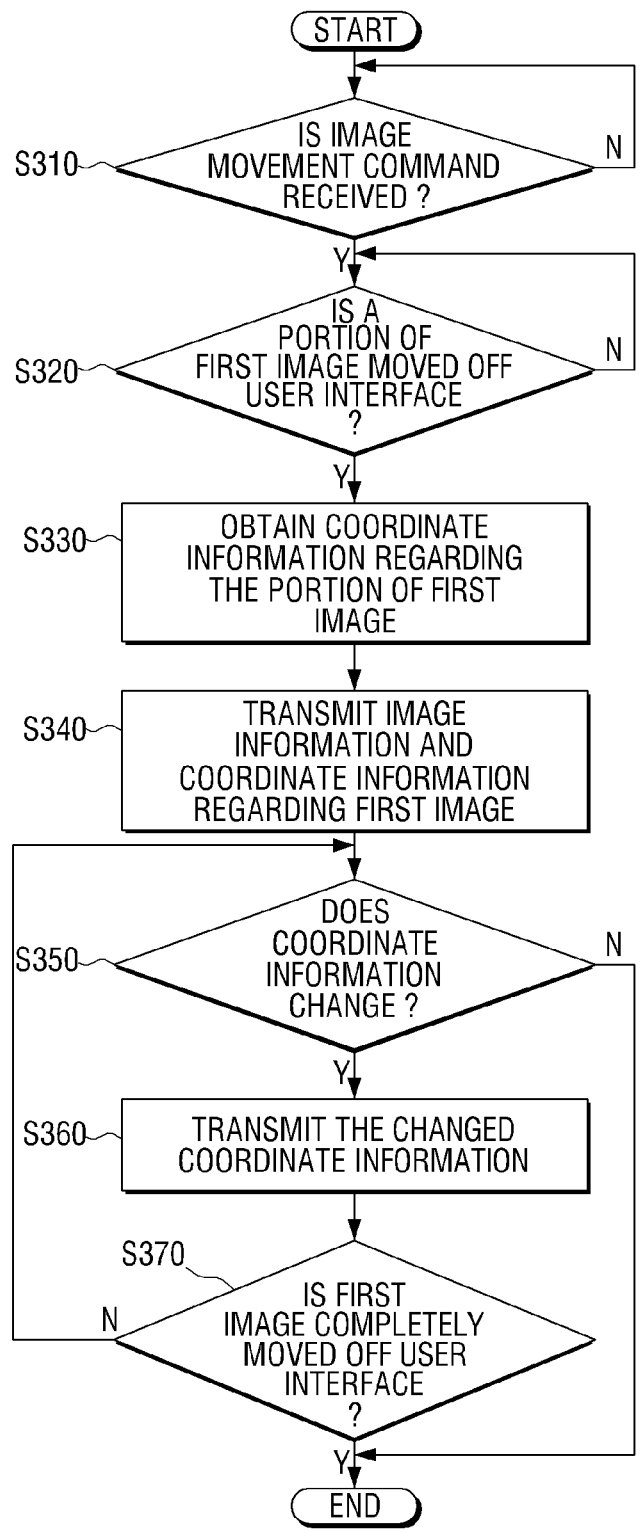
FIG. 2 is a flowchart explaining operations of a second display apparatus to move an image displayed on the second display apparatus to a first display apparatus, according to an exemplary embodiment of the present invention.

FIG. 2 is a flowchart explaining operations of the second display apparatus 200 to move an image displayed on the second display apparatus 200 to the first display apparatus 100, according to an exemplary embodiment of the present invention.

The second controller 250 determines whether an image movement command is input in operation S310. In more detail, if a user desires to move the first image (for example, a broadcast signal) displayed by the second display apparatus 200 to the first display apparatus 100 while continuing to view the first image using the second display apparatus 200, he or she inputs the image movement command by touching and dragging the first image over the user interface 240. In the exemplary embodiment of the present invention, the broadcast signal is received by the second tuner 114 of the first display apparatus 100 through channel 7, transferred from the first display apparatus 100 to the second display apparatus 200 and displayed by the second display apparatus 200.

If it is determined that the image movement command is input in operation S310-Y, the second controller 250 determines whether a portion of the first image is removed from the user interface 240 in operation S320. In more detail, the user touches the first image displayed on the user interface 240 using his or her fingers in order to input the image movement command. Subsequently, while viewing the first display apparatus 100 and the second display apparatus 200, the user drags the first image towards the first display apparatus 100 by touching the user interface 240. Accordingly, the first image is moved over the user interface 240 in a direction and by a distance corresponding to the touching and dragging operation, so that the first image partially disappears from the user interface 240.

If it is determined that a portion of the first image is removed from the user interface 240 in operation S320-Y, the second controller 250 obtains coordinate information regarding the portion of the first image removed from the user interface 240 in operation S330.

The second controller 250 transmits the image information and coordinate information regarding the first image to the first display apparatus 100 via the second communication interface 210 in operation S340. Here, the image information is related to the source of the first image, namely information on channel 7.

The second controller 250 determines whether the coordinate information is changed in operation S350. If the user continues to touch the user interface 240 until the first image is completely removed from the user interface 240 in order to move the first image from the second display apparatus 200 to the first display apparatus 100, the coordinate information may change continuously.

Subsequently, the second controller 250 acquires the changed coordinate information and transmits the obtained coordinate information to the first display apparatus 100 via the second communication interface 210 in operation S360. In this situation, the second controller 250 does not need to transmit the image information, as there is no change in the image information.

In operations S320 to S370, the first image gradually disappears from the user interface 240, and the coordinate information also gradually changes and is transmitted to the first display apparatus 100. Accordingly, the first image may gradually appear on the first display unit 160 of the first display apparatus 100.

As described above, the first image gradually disappears from the second display apparatus 200 and gradually appears on the first display apparatus 100, so it is possible for the user to know from which display apparatus to which display apparatus the image is moved, and to continue to view the image.

FIG. 3 is a flowchart explaining operations of the first display apparatus 100 to move an image displayed on the second display apparatus 200 to the first display apparatus 100, according to an exemplary embodiment of the present invention.

When the second image is being displayed in operation S410, the first controller 180 determines whether the image movement command is received in operation S420. More specifically, if a user enters the image movement command using the second display apparatus 200, the image movement command may be transferred to the first controller 180 via the first communication interface 120, so that the first controller 180 may determine that the image movement command is received.

If it is determined that the image movement command is received in operation S420-Y, the first controller 180 determines whether the image information and coordinate information regarding the first image is received from the second display apparatus 200 in operation S430. In this situation, the first display apparatus 100 may receive the image information and coordinate information regarding the first image from the second display apparatus 200, as a result of operation S340.

The first controller 180 controls the broadcast receiver 110 to receive the first image corresponding to the received image information in operation S440. In the exemplary embodiment of the present invention, the image information comprises the information on channel 7, so the first controller 180 controls the second tuner 114 to receive a broadcast signal via channel 7.

The received first image is decoded by the decoding unit 130, processed to be a displayable signal by the signal processing unit 140, and then transferred to the image combiner 150 in operation S450.

The image combiner 150 combines the first image with the second image based on the coordinate information, and displays the composite image in operation S460. For example, if half of the first image is moved upward and is removed from the user interface 240, the image combiner 150 may perform the combining operation so that a portion of the second image may be displayed on a lower part of the first display unit 160, the half of the first image that is removed from the user interface 240, and the other half of the first image may remain on the user interface 240.

As described above, a portion of the first image and a portion of the second image are displayed on the first display unit 160 of the first display apparatus 100 in the direction in which the first image is removed from the user interface 240 of the second display apparatus 200. Accordingly, the user may feel that the second image continues to move from the second display apparatus 200 to the first display apparatus 100, so it is possible to increase user convenience in using the display apparatuses.

Additionally, the first controller 180 determines whether the changed coordinate information is received in operation S470. Since the second display apparatus 200 obtains the coordinate information change according to the touch and drag operation and transmits the changed coordinate information to the first display apparatus 100, the first controller 180 receives the changed coordinate information.

If the changed coordinate information is received in operation S470-Y, the image combiner 150 combines the first image with the second image based on the changed coordinate information, and the first display unit 160 displays the composite image in operation S480. The first display apparatus 100 displays the composite image according to the changed coordinate information, as described above, and accordingly the first image may gradually appear on the first display unit 160 and the second image may gradually disappear from the first display unit 160.

If the coordinate information is changed so as to represent the first image, the image moving process is finished.

As described above, an image currently displayed on a display apparatus may be moved to other display apparatuses, so it is possible for a user to more freely utilize a plurality of display apparatuses.

Additionally, if a user desires to move an image, he or she may see from which display apparatus to which display apparatus the image is moved, by monitoring the display apparatuses which display the process by which the image is gradually moved. Thus, it is possible to provide convenience to the user.

Furthermore, during movement of the image, not only the image signal but also the information on the source of the image may be transmitted between the display apparatuses, and thus it is relatively easy to transceive data between the display apparatuses. If the image is completely moved, the user needs to manipulate only the first display apparatus 100 instead of the second display apparatus 200, so it is possible to provide user convenience.

While the image disappearing from the second display unit 244 of the second display apparatus 200 is displayed on the first display unit 160 of the first display apparatus 100 in the exemplary embodiment of the present invention, there is no limitation thereto. Accordingly, if a user inputs a command to remove an image displayed on the second display unit 244 from the screen by touching and dragging using the user interface 240 of the second display apparatus 200, the image removed from the second display unit 244 may gradually appear on the first display unit 160. In this situation, the image moved off the second display unit 244 is not required to coincide with the image displayed on the first display unit 160.

Additionally, the image is a broadcast signal in the exemplary embodiment of the present invention, but there is no limitation thereto. Accordingly, if the second display apparatus 200 receives an image from an external device via a network and displays the received image, a user may move the displayed image to the first display apparatus 100 by entering the image movement command according to the exemplary embodiment of the present invention. In this situation, the second display apparatus 200 transmits information on the URI of the image to the first display apparatus 100, and the first display apparatus 100 then accesses the URI via the network to receive a signal corresponding to the image and to display the image.

Hereinafter, a process of displaying an image capable of being moved between the first display apparatus 100 and the second display apparatus 200 in response to the image movement command will be described with reference to FIGS. 4A to 6C.

Figure 4A:
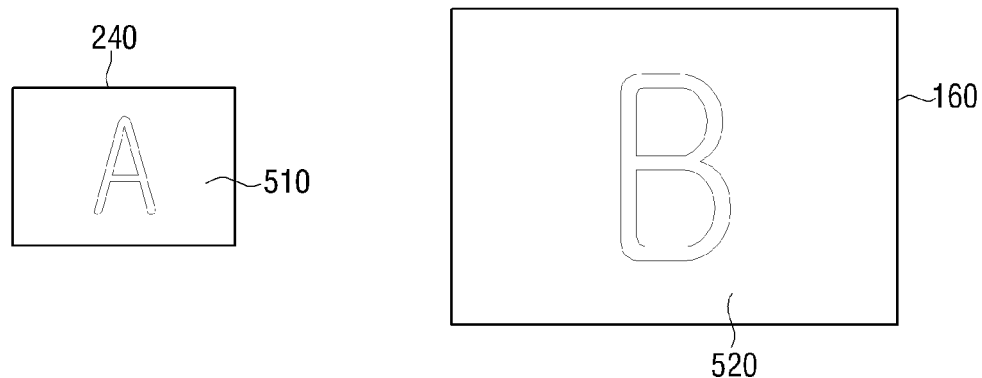
FIGS. 4A to 4C are views provided to explain a process by which images are exchanged between a first display apparatus and a second display apparatus in response to an image movement command and are then displayed, according to an exemplary embodiment of the present invention.
Figure 4B:
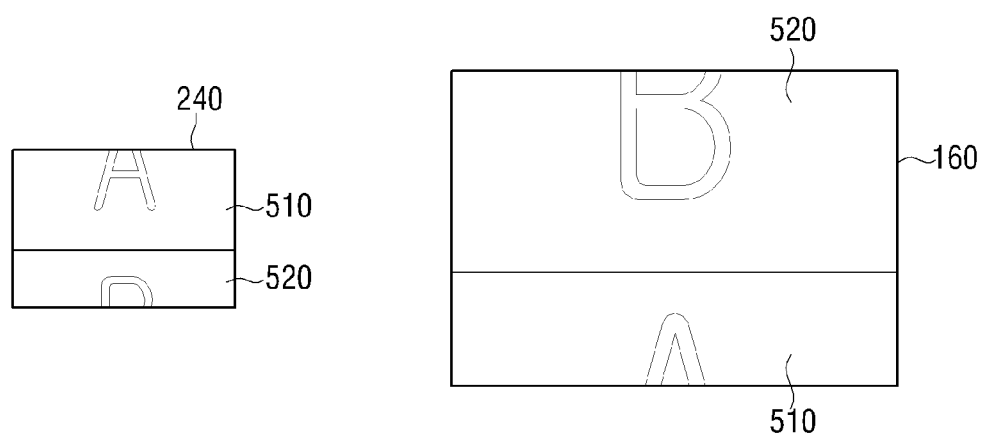
Figure 4C:
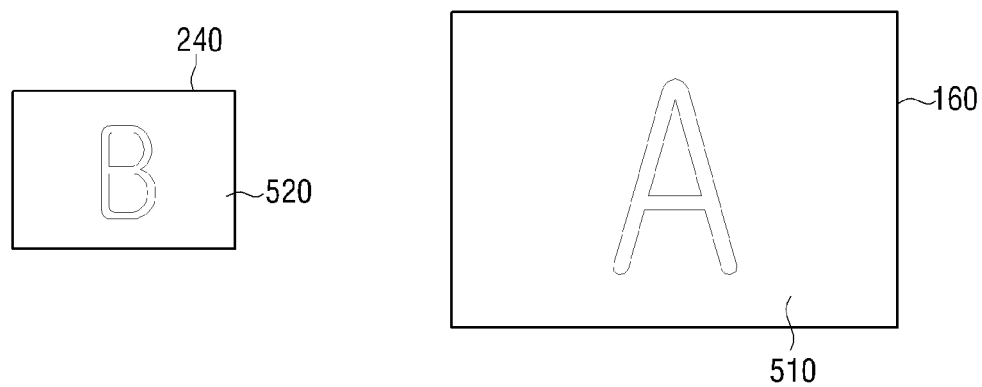

FIGS. 4A to 4C are views provided to explain a process by which images are exchanged between the first display apparatus 100 and the second display apparatus 200 in response to the image movement command and are then displayed, according to an exemplary embodiment of the present invention.

As shown in FIG. 4A, a first image A 510 is displayed on the user interface 240 of the second display apparatus 200, and a second image B 520 is displayed on the first display unit 160 of the first display apparatus 100. In this situation, a user drags the first image 510 upward by touching the user interface 240.

If the user drags the first image 510 halfway up the user interface 240, a lower portion of the first image 510 is displayed on an upper part of the user interface 240, and an upper portion of the second image 520 is displayed on a lower part of the user interface unit 240, as shown in FIG. 4B. Additionally, an upper portion of the first image 510 is displayed on a lower part of the first display unit 160, and a lower portion of the second image 520 is displayed on an upper part of the first display unit 160. Accordingly, the first image 510 and the second image 520 may be exchanged so that the first image 510 may be displayed on the first display apparatus 100 and the second image 520 may be displayed on the second display apparatus 200 according to the touch and drag operation, and thus it is possible for a user to check the process by which the images continue to be moved.

Additionally, after completely disappearing from the user interface 240 according to the touch and drag operation, the first image 510 is displayed on the first display unit 160 of the first display apparatus 100 and the second image 520 is displayed on the user interface 240 of the second display apparatus 200, as shown in FIG. 4C.

Figure 5A:
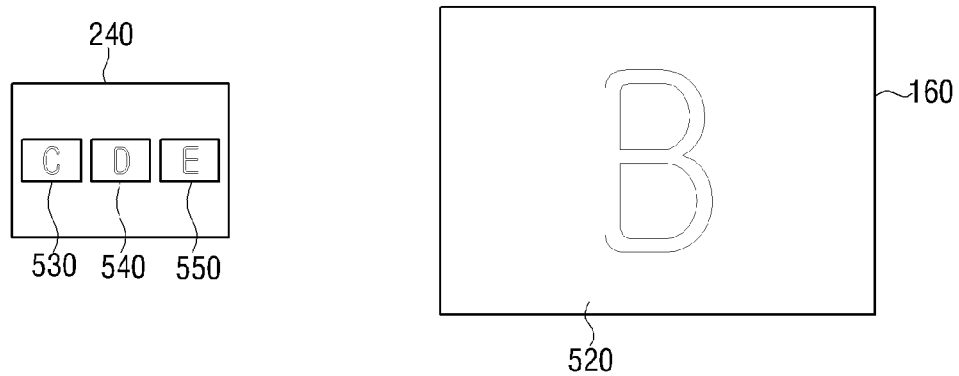
FIGS. 5A to 5D are views provided to explain a process by which images are moved between a first display apparatus and a second display apparatus in response to an image movement command and are then displayed, according to an exemplary embodiment of the present invention.
Figure 5B:
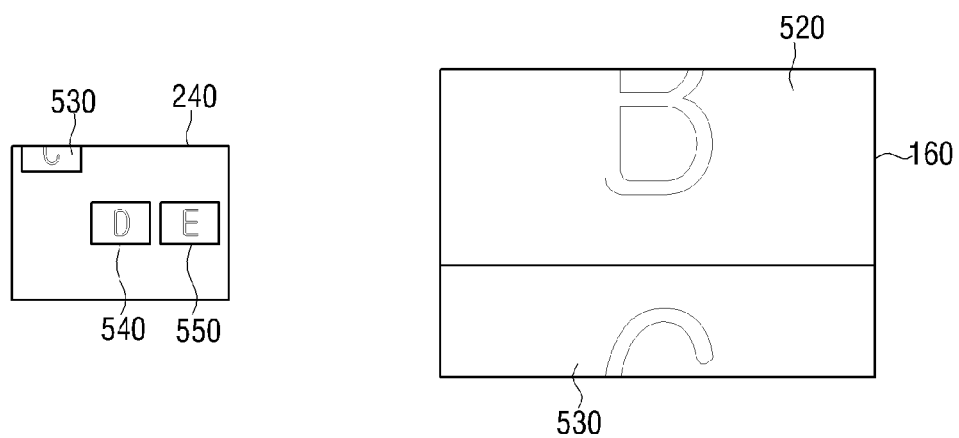
Figure 5C:
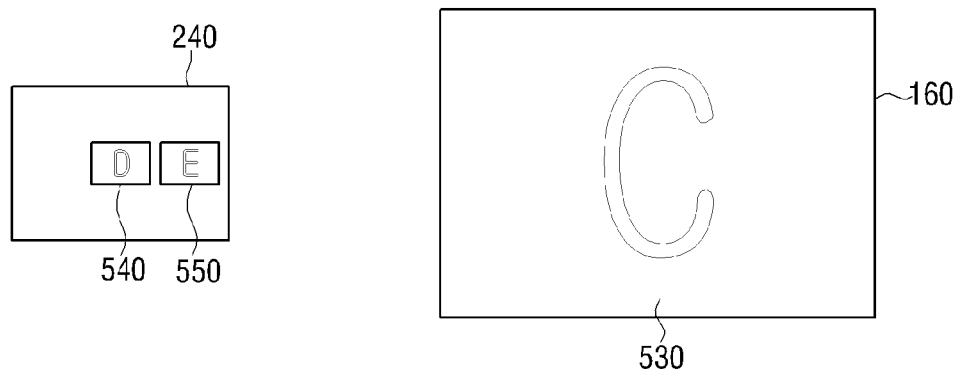

FIGS. 5A to 5C are views provided to explain a process by which images are moved between the first display apparatus 100 and the second display apparatus 200 in response to the image movement command and are then displayed, according to an exemplary embodiment of the present invention.

As shown in FIG. 5A, a plurality of thumbnails, namely a third image C 530, a fourth image D 540 and a fifth image E 550, are displayed on the user interface 240 of the second display apparatus 200, and the second image B 520 is displayed on the first display unit 160 of the first display apparatus 100. If a user desires to move only the third image 530 among the plurality of thumbnails to the first display apparatus 100, he or she touches and drags the third image 530 in an upward direction. Accordingly, the touch and drag operation enables an upper portion of the third image 530 to be removed from the user interface 240, and to be displayed on a lower part of the first display unit 160, as shown in FIG. 5B. After completely disappearing from the user interface 240, the third image 530 is displayed on the first display unit 160 of the first display apparatus 100, so that only the fourth image 540 and fifth image 550 are displayed on the user interface 240 of the second display apparatus 200, as shown in FIG. 5C.

Figure 5D:
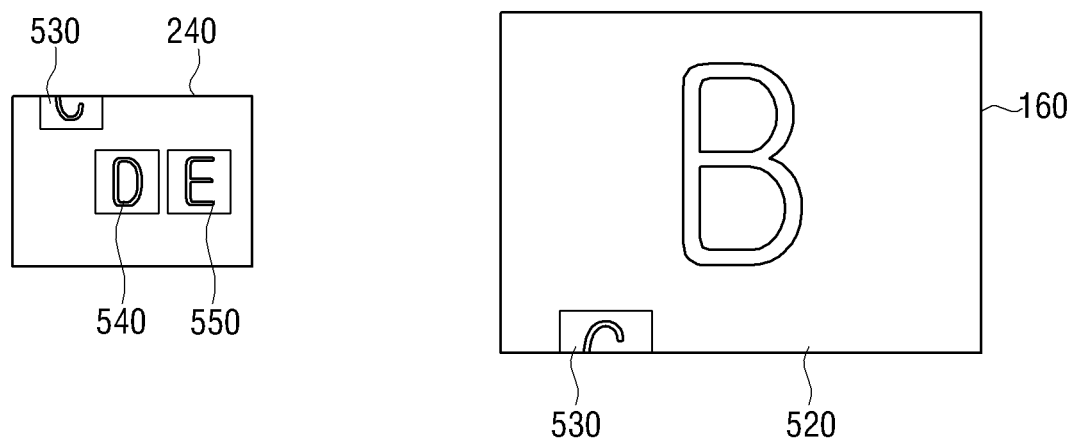

The process of replacing the second image 520 displayed on the first display unit 160 by the first image 510 and displaying the first image 510 on the first display unit 160 has been described with reference to FIGS. 4A to 4C, but there is no limitation thereto. Accordingly, the present invention is also applicable for example to a situation in which the third image 530 is superimposed over the second image 520, as shown in FIG. 5D.

While the user touches and drags the image drags the third image 530 in an upward direction in the exemplary embodiment of the present invention, there is no limitation thereto. Accordingly, the present invention is equally applicable for example to a situation in which a user touches and drags an image downward, to the left or to the right. In this situation, a portion of the image removed from the user interface 240 may be displayed on an upper part, a right part or a left part of the first display unit 160, so an image displayed on the first display unit 160 may also be moved and partially displayed on the user interface unit 240.

Figure 6C:
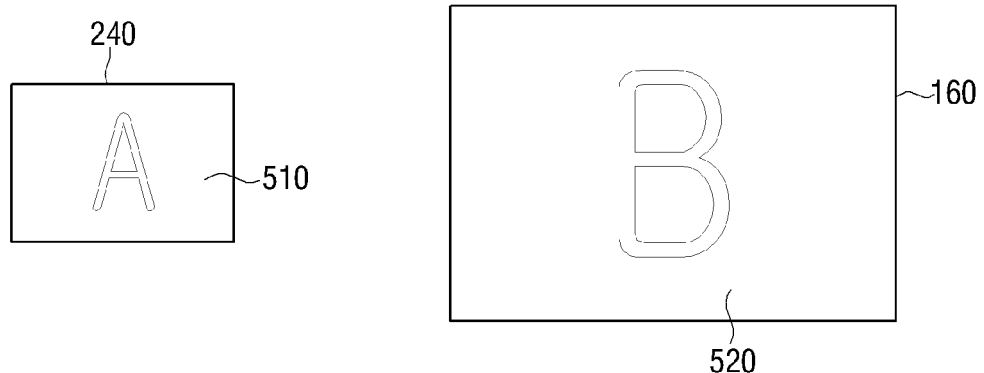
Figure 6B:
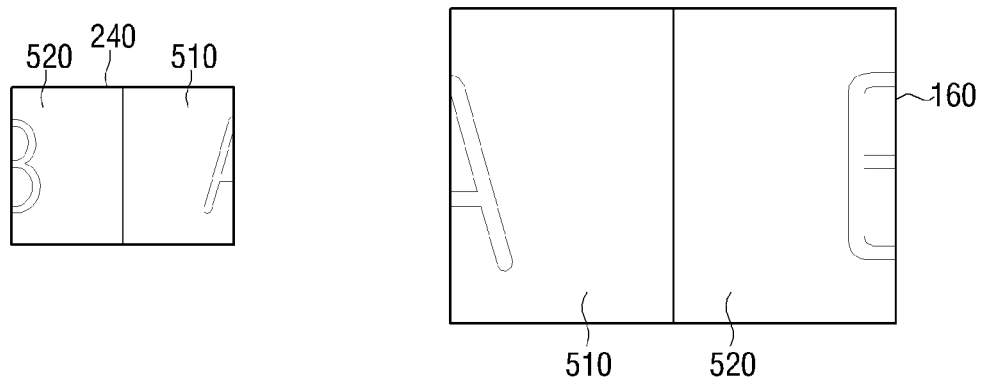
Figure 6C:
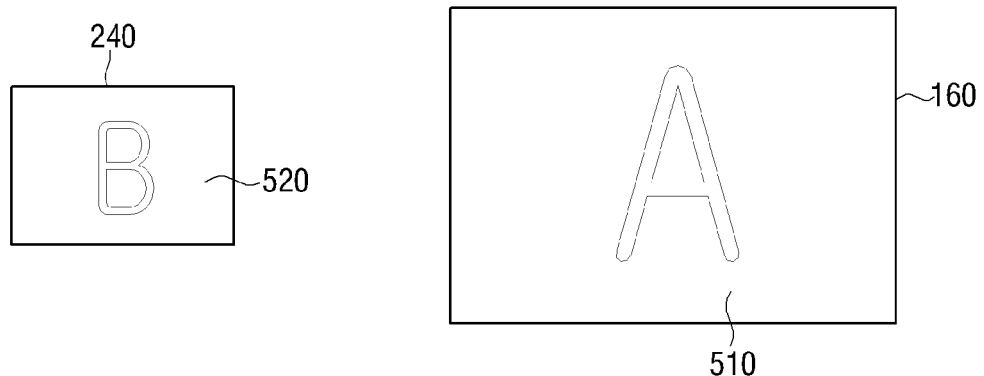

FIGS. 6A to 6C are views provided to explain a process by which a user touches and drags an image to the right to exchange images between the first display apparatus 100 and the second display apparatus 200 and to display the exchanged images, according to an exemplary embodiment of the present invention.

As shown in FIG. 6A, a first image A 510 is displayed on the user interface 240 of the second display apparatus 200, and a second image B 520 is displayed on the first display unit 160 of the first display apparatus 100. In this situation, a user drags the first image 510 to the right by touching the user interface 240.

According to the touch and drag operation, a left portion of the first image 510 is displayed on a right part of the user interface 240, and a right portion of the second image 520 is displayed on a left part of the user interface 240. Additionally, a right portion of the first image 510 is displayed on a left part of the first display unit 160, and a left portion of the second image 520 is displayed on a right part of first display unit 160, as shown in FIG. 6B.

After completely disappearing from the user interface 240, the first image 510 is displayed on the first display unit 160 of the first display apparatus 100 and the second image 520 is displayed on the user interface 240 of the second display apparatus 200, as shown in FIG. 6C.

While the first display apparatus 100 receives the coordinate information on the image removed from the display area of the second display apparatus 200 in the exemplary embodiment of the present invention, there is no limitation thereto. Accordingly, the present invention is also applicable to a situation in which the first display apparatus 100 receives coordinate information on a portion of an image displayed on the display area of the second display apparatus 200. In this situation, the first display apparatus 100 may display a portion of the image excluding the portion of the image displayed on the display area of the second display apparatus 200.

The present invention may be implemented by a computer-readable recording medium. The computer-readable recording medium may store data able to be read by a computer system as described above. Additionally, the computer-readable recording medium may be a read only memory (ROM), a random access memory (RAM), a compact disc (CD)-ROM, an optical data storage device or other storage devices.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
   a display unit;
   an interface which receives coordinate information regarding coordinates of a portion of an image disappearing from a display area of an external device and image information regarding the image which is displayed on the external device from the external device; and
   a controller which controls the display unit to display the portion of the image which disappears from the display area of the external device using the coordinate information and the image information.

2. The display apparatus as claimed in claim 1, wherein the coordinate information comprises coordinates of a portion of the image which is removed from a display area of the external device.

3. The display apparatus as claimed in claim 1, wherein, if a second image is displayed on the display unit instead of the image originally displayed, the controller replaces the second image with the original image and displays the original image.

4. The display apparatus as claimed in claim 3, wherein the controller controls display of the images such that the original image gradually appears on the display unit and the second image gradually disappears from the display unit in a direction in which the original image is removed from a display area of the external device.

5. The display apparatus as claimed in claim 1, wherein, if a second image is displayed on the display unit instead of the image originally displayed, the controller superimposes and displays the original image over the second image.

6. The display apparatus as claimed in claim 1, further comprising a tuner,
   wherein the image source information comprises channel information regarding a channel of the image, and
   wherein the controller controls the tuner to tune to a channel indicated by the channel information and to receive a signal corresponding to the image.

7. The display apparatus as claimed in claim 1, further comprising a network interface,
   wherein the image source information comprises information on a uniform resource identifier (URI) of the image, and
   wherein the controller controls the network interface to access the URI and receive a signal corresponding to the image.

8. The display apparatus as claimed in claim 1, wherein the interface receives an image signal corresponding to the image from the external device, and
   the controller processes the received image signal such that an image portion represented by the coordinate information is displayed on the display unit.

9. A method for controlling a display apparatus, the method comprising:
   receiving coordinate information regarding coordinates of an image disappearing while being displayed on an external device; and
   displaying the image on the display apparatus using the received coordinate information.

10. The method as claimed in claim 9, wherein the coordinate information comprises coordinates of a portion of the image which is removed from a display area of the external device.

11. The method as claimed in claim 9, wherein the displaying comprises, if a second image is displayed instead of the image originally displayed, replacing the second image with the original image and displaying the original image.

12. The method as claimed in claim 11, wherein the displaying comprises gradually displaying the original image on a display area of the display apparatus while the second image gradually disappears from the display area of the display apparatus, in a direction in which the original image is removed from a display area of the external device.

13. The method as claimed in claim 9, wherein the displaying comprises, if a second image is displayed instead of the image originally displayed, superimposing and displaying the original image over the second image.

14. The method as claimed in claim 9, wherein the receiving comprises receiving image source information regarding a source of the image.

15. The method as claimed in claim 14, wherein the image source information comprises channel information regarding a channel of the image, and
further comprising tuning to a channel indicated by the channel information and receiving a signal corresponding to the image.

16. A non-transitory computer readable recording medium having recorded thereon a program for executing the following operations:
displaying a first image on a first device;
displaying a second image on a second device;
receiving a predetermined command comprising coordinate information regarding coordinates of at least a portion of the first image disappearing from the first device;
moving from the first device the at least a portion of the first image in accordance with the predetermined command; and
displaying the moved portion of the first image on the second device while displaying at least a portion of the second image,
wherein the first image is displayed on at least one of the first device and the second device during the moving, wherein:
the second device comprises a broadcast tuner,
the first device comprises a touch screen panel for receiving the predetermined command,
the movement is executed based on the predetermined command, and
wherein the first image is gradually moved in a predetermined direction such that the moved portion of the first image appears on the second device in the predetermined direction and a portion of the second image disappears from being displayed on the second device in the predetermined direction.

17. The non-transitory computer readable recording medium according to claim 16, wherein the movement is gradually performed based on a dragging operation by a user and wherein the moved portion of the first image is superimposed on the displayed second image.

18. The non-transitory computer readable medium according to claim 16, wherein another portion of the second image is moved to and is displayed on the first device and wherein quantity of the moved second image corresponds to quantity of the moved first image.

19. The non-transitory computer readable medium according to claim 16, further comprising combining by the second device the moved portion of the first image and the portion of the second image that is to be displayed on the second device.

* * * * *